United States Patent [19]

Ashe

[11] 4,089,176
[45] May 16, 1978

[54] HEAT STORAGE METHOD AND APPARATUS

[75] Inventor: Thomas L. Ashe, Scottsdale, Ariz.

[73] Assignee: The Garrett Corporation, Los Angeles, Calif.

[21] Appl. No.: 650,822

[22] Filed: Jan. 20, 1976

[51] Int. Cl.² .............................................. F02C 1/04
[52] U.S. Cl. .................................... 60/650; 60/659; 60/682; 219/10.51; 219/325; 219/365; 219/540; 165/DIG. 4
[58] Field of Search ................. 60/659, 650, 682, 644; 219/10.49, 10.51, 325, 341, 365, 378, 530, 540; 165/DIG. 4

[56] References Cited

U.S. PATENT DOCUMENTS

| 3,080,706 | 3/1963 | Flynn, Jr. | 60/523 |
| 3,569,669 | 3/1971 | March | 219/378 |
| 3,596,034 | 7/1971 | Mekjean | 219/378 |
| 3,624,356 | 11/1971 | Havill | 219/378 X |
| 3,630,022 | 12/1971 | Jubb | 60/650 |

FOREIGN PATENT DOCUMENTS

| 2,156,856 | 5/1973 | Germany | 60/659 |

*Primary Examiner*—Allen M. Ostrager
*Attorney, Agent, or Firm*—James W. McFarland; Albert J. Miller

[57] ABSTRACT

Method and apparatus for operating power turbomachinery which includes an electromagnetic induction heated, graphite heat storage core adapted to heat compressed fluid for subsequent expansion across a fluid turbine to generate rotary mechanical power output.

17 Claims, 3 Drawing Figures

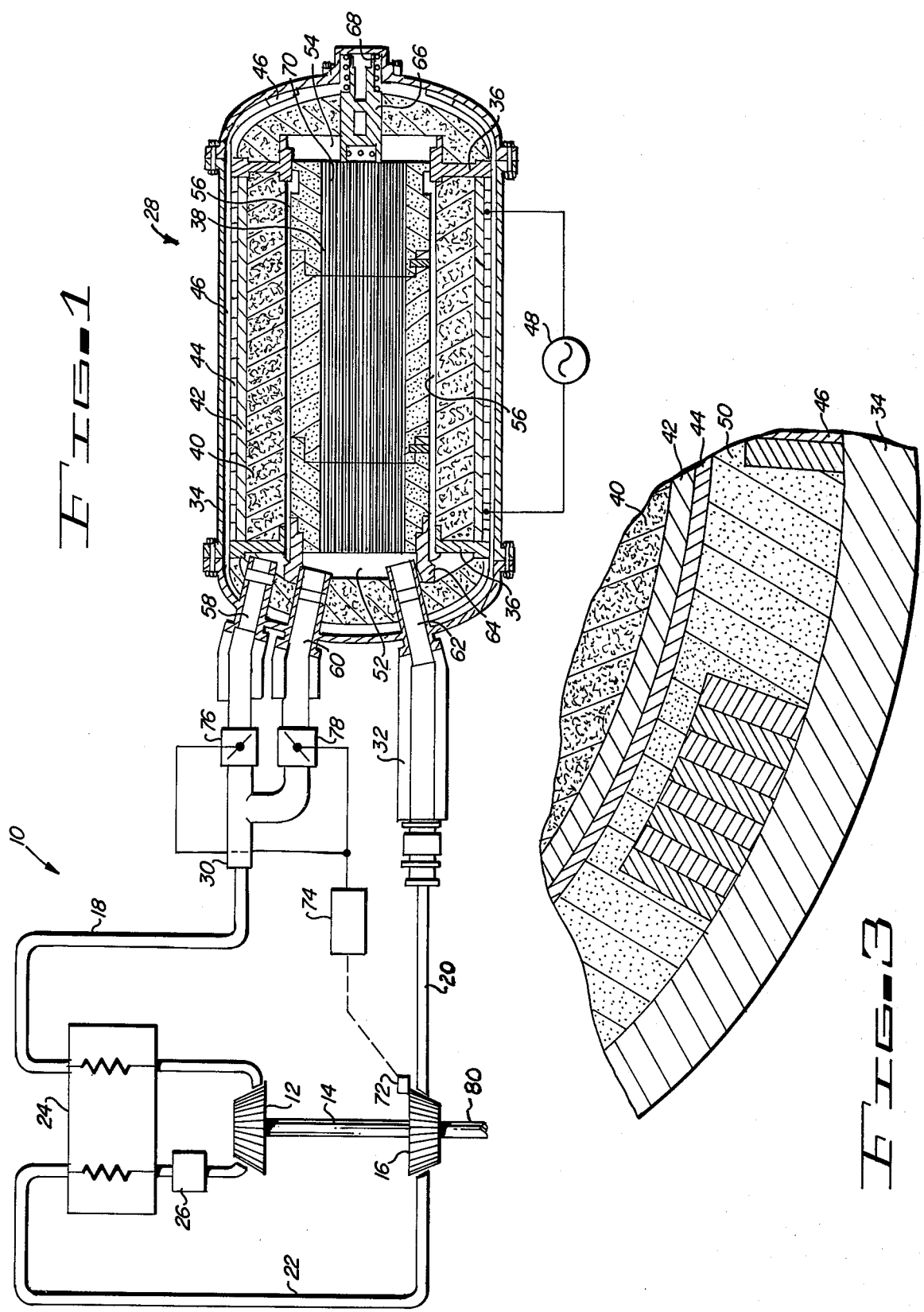

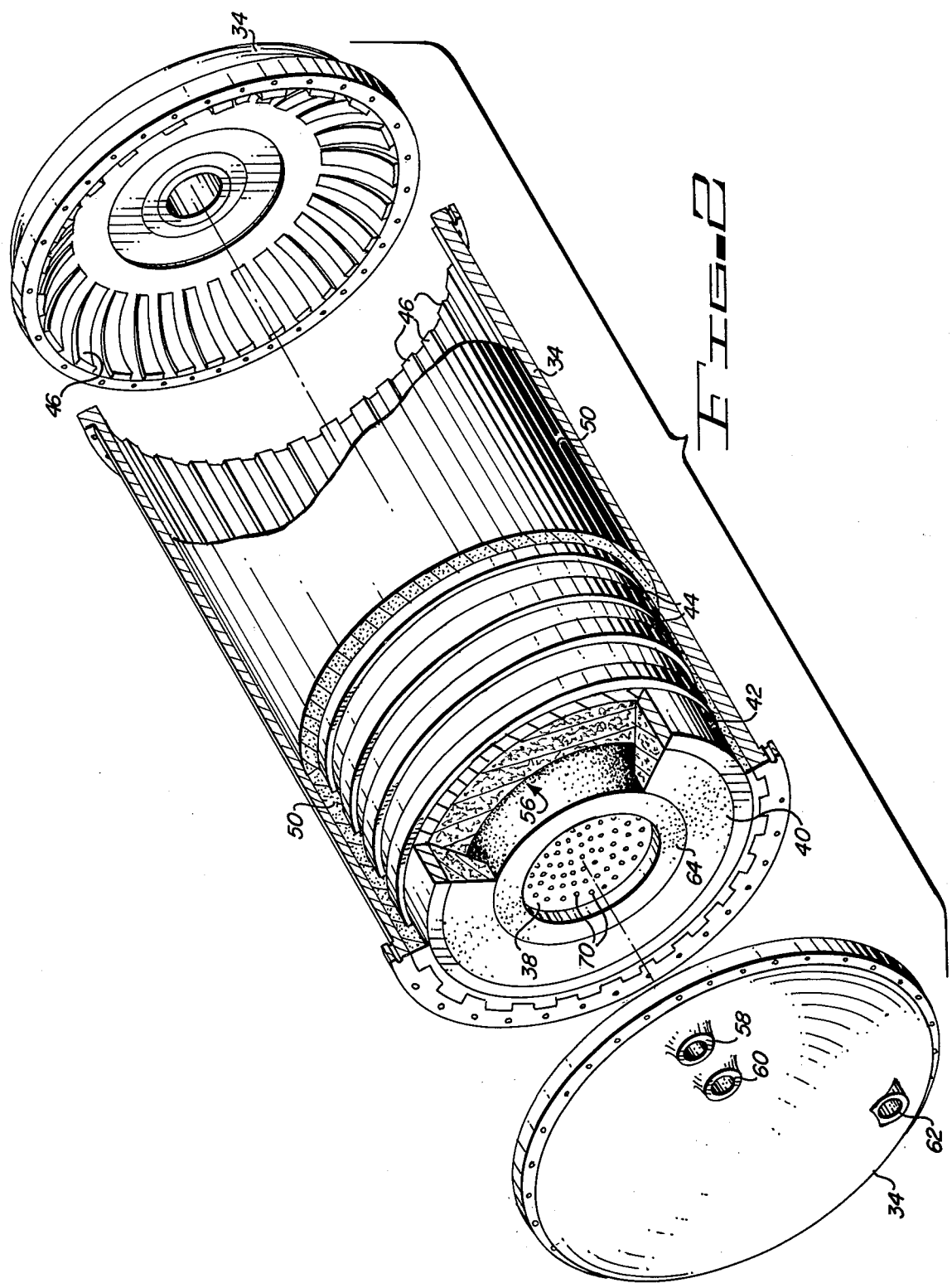

HEAT STORAGE METHOD AND APPARATUS

BACKGROUND OF THE INVENTION

This invention relates to power turbomachinery and relates more particularly to improved apparatus and method providing a noncombusting, electromagnetic induction heated, thermal storage device.

More particularly, the invention relates to method and apparatus for providing a power source in instances where air or other oxidizing agent is not available to support combustion, such as a power source for submerged submarines or torpedoes. Presently known power sources for use in such applications include nuclear power, electrical storage batteries, and heat generation by chemical reaction including thermite compositions. While nuclear power is utilized for power source in many submarines, its complexity due to required safety control devices renders it unfeasible for smaller torpedo drives. Even as a submarine power source, the nuclear power pack must include an emergency backup power source which is usually electrical batteries.

Electrical energy storage batteries are relatively expensive, bulky and heavy in instances where a relatively large power source, sufficiently large to supply driving power to a submarine or torpedo, is required. Also, electrical storage units have an inherent disadvantage of relatively slow recharging. Chemical reaction heat supply systems known to date require rather extensive disassembly of the vehicle and engine system to install new fuel charges. Also the products of such chemical reactions are hazardous and sometimes produce a dangerous gaseous effluent. Whether harmful or not, in many instances the gaseous effluent from chemical reaction units is undesirable in and of itself. Examples of such prior art systems are found in U.S. Pat. Nos. 2,641,905 of Keller; 3,224,199 of Best; 3,400,249 of Mekjean; 3,405,205 of Rowe et al.; 3,516,880 of Johnson; and 3,737,620 of Harvey.

SUMMARY OF THE INVENTION

It is a primary object of the present invention to provide improved apparatus and method relating to a noncombustible power source having high heat and power storage capacity as well as a relatively fast recharging capability.

Another important object of the present invention is to provide an improved noncombustible heat storage unit useful as the heat source for a power source as described in the preceding object, the unit incorporating a foraminated graphite core preheated by electromagnetic induction, and means for controllably heating a working fluid passing through the unit.

More particularly, it is an object of the present invention to provide a closed loop power turbine engine whose working fluid is heated by the heat storage unit described in the preceding object, and wherein are included means for controlling the heating of the working fluid.

In summary, the invention contemplates a closed loop power turbomachinery including a compressor driven by a turbine for compressing a working fluid. The compressed working fluid is delivered to the inlet of a heat storage device which has a central, thermally insulated, foraminated graphite core disposed within an external metallic casing. An electromagnetic induction coil inside the casing is effective to heat the graphite core by an electromagnetic induction, while a laminated magnetic shield prevents heating of the external casing. The heat storage device also includes a fluid outlet delivering the working fluid to the turbine for driving the latter. Within the storage device are defined a pair of fluid passages extending from the inlet to the outlet. One of the passages extends in heat exchange relationship with the heated graphite core, while the other substantially bypasses the core. The temperature of the working fluid delivered to the turbine is determined by the ratio of fluid flows through these two passages. A feedback control, sensing the temperature of the working fluid delivered to the turbine, is operable to adjust the ratio of flows in the two internal passages to maintain a substantially constant temperature of working fluid delivered to the turbine as the graphite core cools during use.

These and other more specific objects and advantages of the present invention are specifically set forth in or will become apparent from the following detailed description of the preferred embodiment of the invention when read in conjunction with the accompanying drawings.

BRIEF DESCRIPTION OF THE DRAWINGS

FIG. 1 is a partially schematic, partially cross-sectional representation of closed-loop power turbomachinery constructed in accordance with the principals of the present invention;

FIG. 2 is a perspective exploded view of the heat storage device, with portions broken away to reveal details of the construction; and FIG. 3 is an enlarged, fragmentary, plan cross-sectional view of the heat storage device.

DETAILED DESCRIPTION OF THE PREFERRED EMBODIMENT

Referring now more particularly to the drawings, there is illustrated a closed-loop, noncombusting, power turbomachinery system generally designated by the numeral 10, which includes a radial compressor 12 driven through shaft 14 by a radial inflow turbine 16. First conduit means including a conduit 18 communicating with the outlet of compressor 12 and conduit 20 communicating with the inlet of turbine 16, carry a compressed fluid flow from the compressor to the turbine to drive the latter. A second conduit means including conduit 22 extends from the outlet of the turbine to the inlet of the compressor to recirculate the working fluid in closed-loop fashion back to the compressor for recompression and reuse. A schematically illustrated recuperator 24 communicates with conduit 18 and 22 such that heat carried in conduit 22 is transferred to fluid in conduit 18. A heat exchanger 26 is disposed in conduit 22 downstream from a conduit 24 for further cooling of fluid carried in conduit 22 prior to returning to the compressor inlet.

A noncombusting heat storage element and apparatus generally referred to by the numeral 28 has a fluid inlet 30 communicating with conduit 18, and a fluid outlet 32 communicating with conduit 20. Heat storage element 28 includes an elongated, cylindrical, external metallic casing 34. Resting upon one or more insulating support legs 36 is a centrally located, elongated, cylindrical, foraminated graphite core 38 which is comprised of a high density, fine grain, pure graphite material. Surrounding and substantially enclosing core 38 is high temperature resistant thermal insulation such as graphite felt insulation 40 having good insulating characteristics as relatively high temperatures, and a second, outer, alumina-silica insulation 42 having good thermal insulation characteristics at lower temperatures. A helical, electromagnetic induction coil 44 wraps around outer insulation 42 along substantially the entire length of cylindrical core 38. Secured to the internal wall of outer casing 34 is a magnetic shield comprising a plurality of generally axially extending, laminated strips 46 of high nickel steel material which are effective to inhibit heating of the metallic casing 34 by electromagnetic induction from coil 44 upon appropriately interconnecting the latter with a source of electrical energy such as the alternating current power supply 48 illustrated in FIG. 1. Preferably, the coil is secured to the external insulation 42, and the magnetic shield secured to the internal wall of casing 34 by a ceramic potting material 50.

Legs 36 restingly support core 38 so as to accommodate thermal expansion and contraction of the latter relative to the external casing 34. While core 38 is comprised of a fine grain graphite which can be substantially heated without inducing thermal cracking of the core, the core 38 when structured in long lengths (e.g. 20 feet or more), may preferably be composed of a plurality of separate sections as illustrated in FIG. 1 to further accommodate thermal expansion and contraction without cracking. Also, the legs 36 support core 38 in slightly spaced relationship from the ceramic insulation 40 to further accommodate thermal expansion of the core. This spaced relationship also defines a fluid mixing chamber 52 at one side or end of the graphite core, a fluid plenum chamber 54 at an opposite side or end, and an annular zone 56 substantially surrounding the core and extending along the axial length thereof. Annular zone 56 along with tube 58 define a first passage extending from inlet 30 to fluid plenum chamber 54. Another tube 60 defines a second fluid passage extending from inlet 30 directly to mixing chamber 52 in operably parallel relationship to the first passage, while a tube 62 defines a third passage for carrying fluid from mixing chamber 52 to outlet 32. At its end adjacent mixing chamber 52, core 38 includes an annular shoulder 64 in fluid sealing engagement with insulation 40 to prevent fluid communication between annular zone 56 and fluid mixing chamber 52. Urging core 38 and shoulder 64 leftwardly into engagement with insulation 40 is a piston member 66 and a biasing means in the form of a spring 68 operably extending between the casing and one end of core 38. Internal passages 70 within the foraminated core 38 provide fluid communication between mixing chamber 52 and plenum chamber 54. To this end, the inner end of piston 66 is perforated to assure that the centrally located internal passages 70 also communicate with plenum chamber 54.

The power turbomachinery system 10 and its storage device 28 further includes feedback control means schematically illustrated in FIG. 1. The feedback control preferably incorporates a temperature sensor 72 for sensing the temperature of working fluid delivered to the inlet of turbine 16. Through an appropriate transducer 74 incorporated as necessary, the sensed temperature is translated into a signal capable of controlling a pair of fluid flow control valves 76, 78. Each control valve may be a butterfly type control valve pneumatically actuated by a pneumatic signal generated in relation to the sensed temperature. The feedback control system is schematically illustrated by dashed lines to show the operable interconnections of the control valve with the sensed temperature at the inlet of turbine 16.

The feedback control system may take various forms and include electrical, pneumatic, as well as mechanical interconnections. Preferably, the feedback control system is such that the two valves 76, 78 are relatively simultaneously, oppositely actuated, with opening movement of valve 76 accompanied by corresponding closing movement of valve 78, and vice versa.

In operation, graphite core 38 is preheated by electromagnetic induction by first interconnecting coil 44 with electrical energy power source 48. Eddy currents are established in core 38 causing substantial heating thereof while the laminated magnetic shield strips 46 inhibit induction heating of the external metallic casing 34. The power system is maintained in standby condition by heating and holding the graphite core at a desired temperature. Preferably, core 38 is heated to a substantially high temperature of several thousand degrees Fahrenheit and substantially higher than the temperature required of working fluid in driving turbine 16. During operation of the system to produce rotary mechanical power output from turbine 16, working fluid is compressed by compressor 12 and delivered to conduit 18 into the inlet 30 of the heat storage element 28. The inlet flow is divided between passages 58 and 60 in relation to the positions of valves 76 and 78. A first portion of the fluid flow passes through passage 58 and annular zone 56 into plenum chamber 54 for subsequent passage through internal passages 70 in heat exchange relationship with graphite core 38 to ultimately reach the fluid mixing chamber 52 at a temperature substantially higher than that required to drive turbine 16. The remaining fluid from inlet 30 passes through tube 60 relatively directly into fluid mixing chamber 52 without significant heating by graphite core 38 so as to reach mixing chamber 52 at a temperature substantially lower than that required to drive the turbine 16. The two portions of fluid flow are then recombined in mixing chamber 52 to be delivered through tube 62 to the turbine inlet at a substantially uniform temperature. The heated, compressed fluid flow expands across turbine 16 to drive the latter and to produce rotary mechanical power output in an output shaft 80. A portion of the rotary mechanical power generated by turbine 16 is transferred to shaft 14 to drive compressor 12 so as to compress the fluid flow. The expanded fluid is then exhausted from turbine 16 and returned to conduit 22 back to the compressor for reuse. A portion of the heated fluid carried in conduit 22 is recuperated back into the system through recuperator 24 for initial preheating of the compressed fluid carried in conduit 18. After passing through the recuperator the fluid in conduit 22 is cooled to a substantially low temperature by heat exchanger 26 prior to delivery to the fluid inlet of compressor 12.

Throughout this operation, the feedback control means are operable to vary the ratio of fluid flows in passages 58 and 60 to control the temperature of fluid exhausted from heat storage element 28. Preferably, the feedback control means are operable to vary this ratio to maintain a substantially constant working fluid temperature at turbine inlet 16. The desired constant temperature of fluid delivered to the turbine is intermediate the temperature of the relatively cool fluid passing through tube 60 into mixing chamber 52 and the relatively hot fluid passing via the core 38 into mixing chamber 52. Such control thereby automatically accommodates loss of heat in the graphite core throughout the mission duration by increasing the portion of flow passing through plenum chamber 54 and the graphite core 38 as the latter cools. In this manner it will be apparent that the feedback controls by relatively, simultaneously oppositely actuating of the two valves 76 and 78 can control turbine inlet temperature to the desired level so long as the temperature of the graphite core is above that desired temperature.

Upon completion of the mission and shut-down of the turbomachinery power system 10, heat storage device 28 may be simply recharged by appropriate interconnection with the electrical energy source 48. The device can be recharged as fast as power can be delivered. Recharging and reheating of the graphite core 38 is thus accomplished without any disassembly of the heat storage element. Also, by utilization of the noncombustion, nonreaction, heat storage graphite core 38, no hazardous effluents are generated at any time, and no hazardous materials must be handled either during mission life or during recharging. By utilization of a fine grain, high density, pure graphite core 38, the relative size and weight of heat storage device 28 is comparable to or substantially less than equivalent chemical heat generators and/or battery storage devices. While the system has been described as a mechanism for producing rotary mechanical power in a submarine, torpedo or other device located in a noncombustible atmosphere, it will be apparent that the present invention is equally useful in other instances where a noncombusting power source is utilized.

From the foregoing it will be apparent that the present invention also contemplates an improved method of producing mechanical power which includes the steps of preheating a noncombustion heat storage core 38 by electromagnetic conduction through an induction coil 44 connectible to an electrical energy source. After compressing a working fluid and dividing it into first and second portions, the second portion in passage 58 is passed in heat exchange relationship with core 38 and then on to mixing chamber 52 to reach the latter at a high temperature, while the first portion of fluid in passage 60 is passed directly to the mixing chmber to reach it at a relatively low temperature. The two portions of fluid are then recombined and exhausted from mixing chamber 52 at a temperature intermediate the high and low temperatures. The heated, compressed fluid expands across a fluid motor such as the radial inflow turbine 16 to produce rotary mechanical power output. By regulating the ratio of the first and second portions of fluid flow in passages 58 and 60, the temperature of fluid delivered to turbine 16 can be controlled to a substantially constant desired level through substantially simultaneous, opposite actuation of valves 76 and 78. Exhaust fluid from the turbine motor is cooled by passing it through a recuperator 24 which recuperates a portion of the heat of the expanded fluid back into the compressed fluid delivered from the compressor at a location upstream of the heating element 28. Also, additional cooling of the expanded fluid is accomplished by passing it through the heat exchanger 26. A portion of the mechanical power developed by turbine 16 is utilized in driving compressor 12 to compress the fluid.

Various modifications and alterations to the foregoing will be apparent to those skilled in the art. Accordingly, the foregoing detailed description of the preferred embodiment of the invention should be considered exemplary in nature and not as limiting to the scope and spirit of the invention as set forth in the appended claims.

Having described the invention with sufficient clarity that those skilled in the art may make and use it, I claim:

1. Power turbomachinery, comprising:
    a compressor for compressing a working fluid;
    a turbine driven by the compressed working fluid to produce a mechanical power output;
    a pair of operably parallel passages for carrying fluid from said compressor to said turbine;
    a noncombustion heat storage element cooperating with one of said passages for heating the working fluid therein being delivered from said compressor to said turbine whereby the compressed, heating working fluid expands across said turbine to drive the latter and the temperature of working fluid delivered to said turbine is dependent upon the ratio of fluid flowing through said pair of passages;
    means adapted to be connected to a source of electrical energy for preheating said storage element by electromagnetic induction, said storage element comprising a solid, carbonaceous, foraminated body which is subject to continuing loss of stored heat as it heats fluid in said one of the passages subsequent to said preheating; and
    control means for adjusting said ratio of fluid flowing through said pair of passages to accommodate for the continuing loss of heat from said storage element as the latter heats fluid in said one of the passages.

2. Noncombustion turbomachinery, comprising
    a compressor for compressing a working fluid;
    a turbine driven by the compressed working fluid;
    first conduit means including a pair of operably parallel passages for carrying working fluid form said compressor to said turbine;
    second conduit means for returning working fluid from said turbine to said compressor;
    a noncombustion heat storage element arranged to substantially heat the working fluid carried in only one of said of pair of passages whereby the temperature of working fluid delivered to said turbine is dependent on the ratio of working fluid flowing through said pair of passages; and
    control means operably coupled with said first conduit means for controlling said ratio to maintain said temperature substantially constant,
    said control means including means for sensing said temperature of fluid delivered to the turbine, adjustable valve means disposed in said first conduit means, and feedback means operably coupled with said sensor and said valve means for adjusting the latter to alter said ratio in relation to said sensed temperature.

3. Turbomachinery as set forth in claim 2, wherein said valve means includes a flow control valve in each of said first and second passages, said feedback means operable to substantially simultaneously oppositely adjust and valves.

4. Turbomachinery as set forth in claim 3, further including means defining a mixing chamber for receiving and recombining fluid from both said first and second passages.

5. Turbomachinery as set forth in claim 3, further including a heat exchanger disposed in heat exchange relationship with said second conduit means for cooling fluid therein prior to its return to said compressor.

6. Turbomachinery as set forth in claim 5, further including a recuperator disposed in heat exchange relationship with said second conduit means upstream of said heat exchanger and with said first conduit means upstream of said heat storage element to effect transfer of heat from fluid in said second conduit means to fluid in said first conduit means.

7. Power turbomachinery, comprising:
a compressor for compressing a working fluid;
a turbine driven by the compressed working fluid to produce a mechanical power output;
conduit means for carrying the working fluid between said compressor and said turbine in recirculatory, closed loop fashion;
a noncombustion heat storage element cooperating with said conduit means for heating the working fluid being delivered from said compressor to said turbine whereby the compressed, heating working fluid expands across said turbine to drive the latter; and
means adapted to be connected to a source of electrical energy for heating said storage element by electromagnetic induction,
said heat storage element including an external metallic casing having fluid inlet and outlet means, a foraminated graphite core supported generally centrally within said casing, thermal insulation within the casing and substantially enclosing said core and cooperating therewith to define a mixing chamber and a plenum chamber on opposite sides of said core communicating with one another through said foraminated core, means in the housing defining first and second flow passages communicating said casing inlet means with said mixing chamber and said plenum chamber respectively, and means defining a third flow passage communicating said mixing chamber with said casing outlet means.

8. Turbomachinery as set forth in claim 7, wherein said means for heating said storage element includes an electromagnetic induction coil disposed within said casing in surrounding relationship to said insulation and operable to heat said core by electromagnetic induction.

9. Turbomachinery as set forth in claim 8, further including a laminated magnetic shield disposed between said coil and said casing for inhibiting heating of the latter during heating of said core.

10. In combination:
(a) a rotary compressor having a fluid inlet and discharge for receiving fluid at said inlet and exhausting the fluid through said discharge in a compressed state;
(b) a hollowed, metallic, external casing having fluid inlet and outlet means;
(c) first conduit means communicating said compressor discharge with said casing inlet means;
(d) a foraminated graphite core supported generally centrally within said external casing;
(e) thermal insulation in said casing substantially enclosing said core and cooperating therewith to define a fluid mixing chamber and a separate fluid plenum chamber, said core having a plurality of internal through passages communicating with both said mixing and plenum chambers;
(f) an electromagnetic induction coil disposed between said insulation and said external casing, said coil adapted to be connected to an external source of electrical energy to heat said core by electromagnetic induction;
(g) a laminated magnetic shield disposed between said coil and said external casing for inhibiting heating of said casing during heating of said core;
(h) means in said casing defining first and second fluid passages extending from said casing inlet means to said mixing chamber and said plenum chamber respectively, whereby a portion of the fluid exhausted from said compressor flows through said first passage to reach said mixing chamber at a temperature below said constant temperature, while the remainder of the fluid flows through said second passage to said plenum chamber and then through said internal passages in heat exchange relationship with said core to reach said mixing chamber at a temperature above said constant temperature;
(i) means in said casing defining a third fluid passage extending from said mixing chamber to said casing outlet means whereby fluid is exhausted from said outlet means at a temperature dependent upon the ratio of fluid flowing through said first and second passages;
(j) an adjustable flow control valve associated with each of said first and second passages for altering said ratio of fluid flows in the first and second passages;
(k) a rotary turbine having a fluid inlet communicating with said casing outlet means whereby the fluid exhausted from the latter expands across said turbine to rotate the turbine, said turbine having a fluid outlet;
(l) feedback means operably coupled with said turbine and said valves for sensing temperature of fluid at said turbine inlet and actuating said valves in relation to said sensed temperature to alter said ratio of fluid flows to maintain said temperature of fluid at the turbine inlet at substantially constant, preselected level;
(m) second conduit means communicating said turbine outlet with said compressor inlet for returning the fluid to said compressor;
(n) a heat exchanger operably communicating with said second conduit means for cooling the fluid prior to its return to said compressor;
(o) a recuperator operably communicating with said second conduit means upstream of said heat exchanger and communicating with said first conduit means whereby a portion of the heat carried by fluid in said second conduit means is transferrred to fluid in said first conduit means; and
(p) a shaft operably interconnecting said turbine and compressor whereby rotation of said turbine effects rotation of said compressor.

11. In combination with power turbomachinery including a fluid compressor, a fluid expansion motor, and conduit means for carrying fluid between the compressor and motor in closed loop, recirculatory fashion:
a noncombustion heat storage element comprising a solid, foraminated, carbonaceous sensible heat storage body cooperating with said conduit means for heating fluid being delivered from said compressor to said motor whereby the heated fluid expands across said motor to drive the latter; and
means adapted to be connected to a source of electrical energy for heating said element by electromagnetic induction.

12. A method of producing mechanical power, comprising the steps of:
   preheating a noncombustion heat storage unit by electromagnetic induction;
   compressing a working fluid;
   dividing the compressed working fluid into first and second portions;
   heating the first portion of fluid by passing it through the heat storage unit in heat exchange relationship therewith and then onto a mixing chamber to reach the latter at a relatively high temperature, said heating of the first portion of fluid causing a continuing loss of heat stored in said storage unit;
   passing the second position of fluid to said mixing chamber to reach said mixing chamber at a relatively low temperature;
   recombining the first and second portions of fluid in the mixing chamber for subsequent exhaust therefrom at a temperature intermediate said high and low temperatures;
   extending the recombined fluid across a fluid motor to produce a mechanical power output;
   regulating the ratio of said first and second portions of fluid to accommodate for said continuing loss of heat by the storage unit and control said intermediate temperature of the recombined fluid to a substantially constant, preselected level;
   cooling the expanded fluid exhausted from the motor; and
   recirculating the cooled fluid in closed loop fashion for recompression and reuse.

13. A method as set forth in claim 12, further including the step of utilizing a portion of said mechanical power to effect said compressing step.

14. A method as set forth in claim 12, wherein said regulating step further includes sensing said intermediate temperature and substantially simultaneously oppositely actuating a pair of flow control valves to regulate said ratio.

15. A method as set forth in claim 12, wherein said cooling step includes passing the expanded fluid through a heat exchanger.

16. A method as set forth in claim 15, wherein said cooling step further includes recuperating a portion of the heat carried in said expanded fluid prior to passing through said heat exchanger by directing the expanded fluid into heat exchange relationship with the compressed fluid at a location upstream of said heat storage unit.

17. A method of producing mechanical power comprising the steps of:
   preheating a solid, foraminated, carbonaceous heat storage unit by electromagnetic induction;
   compressing a working fluid;
   separating the working fluid into first and second portions;
   passing said first portion of the compressed fluid in heat exchange relationship with said heat storage unit to heat said first portion and cause a continuing loss of heat stored in said storage unit;
   recombining said heated first portion and said second portion of the compressed fluid;
   expanding the recombined fluid across a fluid motor to drive a mechanical power output shaft; and
   regulating the ratio of said first and second portions of fluid to accommodate for said continuing loss of heat to maintain the temperature of said recombined fluid at a substantially constant preselected level.

* * * * *

UNITED STATES PATENT AND TRADEMARK OFFICE
CERTIFICATE OF CORRECTION

PATENT NO. : 4,089,176

DATED : May 16, 1978

INVENTOR(S) : Thomas L. Ashe

It is certified that error appears in the above-identified patent and that said Letters Patent are hereby corrected as shown below:

Column 6, line 60, read "and" as --said--.

Column 9, line 15, read "position" as --portion--;

line 22, read "extending" as --expanding--.

Signed and Sealed this

Nineteenth Day of September 1978

[SEAL]

Attest:

RUTH C. MASON
Attesting Officer

DONALD W. BANNER
Commissioner of Patents and Trademarks